(12) United States Patent
Devarakonda

(10) Patent No.: US 9,435,244 B1
(45) Date of Patent: Sep. 6, 2016

(54) SYSTEM AND METHOD FOR INJECTION CONTROL OF UREA IN SELECTIVE CATALYST REDUCTION

(71) Applicant: General Electric Company, Schenectady, NY (US)

(72) Inventor: Maruthi Narasinga Rao Devarakonda, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/686,350

(22) Filed: Apr. 14, 2015

(51) Int. Cl.
*F01N 3/00* (2006.01)
*F01N 3/20* (2006.01)
*F01N 9/00* (2006.01)
*F01N 11/00* (2006.01)

(52) U.S. Cl.
CPC ............... *F01N 3/208* (2013.01); *F01N 9/00* (2013.01); *F01N 11/00* (2013.01)

(58) Field of Classification Search
USPC ......... 60/274, 275, 276, 277, 286, 295, 297, 60/301, 303
See application file for complete search history.

(56) References Cited

U.S. PATENT DOCUMENTS

| | | |
|---|---|---|
| 5,029,565 A | 7/1991 | Talbot |
| 5,111,790 A | 5/1992 | Grandy |
| 5,115,778 A | 5/1992 | Holroyd |
| 5,119,783 A | 6/1992 | Komurassaki |
| 5,241,480 A | 8/1993 | Takaku et al. |
| 5,257,533 A | 11/1993 | Imada |
| 5,337,240 A | 8/1994 | Nakagawa et al. |
| 5,339,245 A | 8/1994 | Hirata et al. |
| 5,361,213 A | 11/1994 | Fujieda et al. |

(Continued)

FOREIGN PATENT DOCUMENTS

| CN | 203480037 | 3/2014 |
|---|---|---|
| EP | 1447654 | 8/2004 |

(Continued)

OTHER PUBLICATIONS

U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.

(Continued)

*Primary Examiner* — Binh Q Tran
(74) *Attorney, Agent, or Firm* — Fletcher Yoder, P.C.

(57) ABSTRACT

A system includes an exhaust aftertreatment system configured to treat emissions from a combustion engine. The exhaust aftertreatment system includes a selective catalytic reduction (SCR) catalyst assembly and at least one radio frequency (RF) probe disposed within the SCR catalyst assembly. A controller is coupled to the exhaust aftertreatment system and utilizes an $NH_3$ storage estimate measured by the at least one RF probe and an $NH_3$ storage estimate determined by an $NH_3$ storage estimate model to output a control action for a reductant injection system. The $NH_3$ storage estimate model utilizes measured concentrations of nitrogen oxides ($NO_x$) in the fluid upstream or downstream of the SCR catalyst and/or measured concentrations of $NH_3$ in the fluid upstream or downstream of the SCR catalyst, and the $NH_3$ storage measurement from the at least one RF probe to determine the $NH_3$ storage estimate.

20 Claims, 4 Drawing Sheets

(56) References Cited

U.S. PATENT DOCUMENTS

| | | |
|---|---|---|
| 5,392,642 A | 2/1995 | Tao |
| 5,400,648 A | 3/1995 | Mahr |
| 5,452,699 A | 9/1995 | Rossignol |
| 5,467,638 A | 11/1995 | Philipp |
| 5,594,649 A | 1/1997 | Cook et al. |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizume et al. |
| 5,932,801 A | 8/1999 | Akishita et al. |
| 5,934,256 A | 8/1999 | Wenzlawski et al. |
| 5,996,398 A | 12/1999 | Schleupen et al. |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Torno et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,181,338 B2 | 2/2007 | Takemura et al. |
| 7,191,658 B2 | 3/2007 | Oda et al. |
| 7,212,909 B2 | 5/2007 | Yoshino et |
| 7,243,529 B2 | 7/2007 | Takemura et al. |
| 7,246,600 B2 | 7/2007 | Nakashima et al. |
| 7,260,469 B2 | 8/2007 | Birk et al. |
| 7,260,930 B2 * | 8/2007 | Decou ............... F01N 9/002 60/274 |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,670,132 B2 | 3/2010 | Huang |
| 7,712,450 B2 | 5/2010 | Sato et al. |
| 7,747,380 B2 | 6/2010 | Chauvin et al. |
| 7,810,313 B2 * | 10/2010 | Stewart ............... F01N 3/208 422/105 |
| 7,810,469 B2 | 10/2010 | Vigild et al. |
| 7,823,561 B2 | 11/2010 | Omuro et al. |
| 7,832,200 B2 * | 11/2010 | Kesse ............... F01N 3/106 60/274 |
| 8,000,884 B2 | 8/2011 | Aso et al. |
| 8,032,293 B2 | 10/2011 | Binder et al. |
| 8,068,972 B2 | 11/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 8/2012 | Schneider et al. |
| 8,260,531 B2 | 9/2012 | Yasuda |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,607,548 B2 * | 12/2013 | Zayan ............... B01D 53/9495 123/488 |
| 8,627,800 B2 | 1/2014 | Glugla et al. |
| 8,639,432 B2 | 1/2014 | Matsuo et al. |
| 8,677,975 B2 | 3/2014 | Auclair et al. |
| 8,680,707 B2 | 3/2014 | Childs et al. |
| 8,701,389 B2 * | 4/2014 | Thomas ............... F01N 3/208 60/286 |
| 8,849,471 B2 | 9/2014 | Daniel et al. |
| 9,109,493 B2 * | 8/2015 | Lin ............... F01N 3/208 |

FOREIGN PATENT DOCUMENTS

| | | |
|---|---|---|
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc.of SPIE 5391, Smart Struc. & Materials, Jul. 2004.
Beulertz, G., et al.; "Replacing the lambda probe by radio frequency-based in-operando three-way catalyst oxygen loading detection"; DOI 10.5162/IMCS 2012/P2.2.7—the 14th International Meeting on Chemical Sensors; pp. 1426-1428.
U.S. Appl. No. 14/644,399, filed Mar. 11, 2015, Maruthi Narasinga Rao Devarakonda.
U.S. Appl. No. 14/669,934, filed Mar. 26, 2015, Maruthi Narasinga Rao Devarakonda.

* cited by examiner

SYSTEM AND METHOD FOR INJECTION CONTROL OF UREA IN SELECTIVE CATALYST REDUCTION

BACKGROUND

The subject matter disclosed herein relates to an exhaust aftertreatment system for an internal combustion engine and, more specifically, to controlling a reductant injection.

Engines (e.g., internal combustion engines such as reciprocating engines or gas turbines) combust a mixture of fuel and air to generate combustions gases that apply a driving force to a component of the engine (e.g., to move a piston or drive a turbine). Subsequently, the combustion gases exit the engine as an exhaust, which may be subject to exhaust treatment (e.g., aftertreatment) systems that include one or more catalytic converters (e.g., selective catalytic reduction (SCR) assembly) to reduce the emissions of nitrogen oxides ($NO_x$) by converting $NO_x$ and other emissions to less harmful byproducts. However, the reductant levels have to be controlled precisely to achieve the desired $NO_x$ reduction.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes an exhaust aftertreatment system configured to treat emissions from a combustion engine. The exhaust aftertreatment system includes a selective catalytic reduction (SCR) catalyst assembly that receives a fluid from the combustion engine, wherein the SCR catalyst assembly has an inlet and an outlet and at least one radio frequency (RF) probe disposed within the SCR catalyst and configured to measure ammonia ($NH_3$) storage of the SCR catalyst. The exhaust aftertreatment system also includes an injection system configured to inject $NH_3$ or urea into the fluid upstream of the inlet of the SCR catalyst. The aftertreatment system further includes a controller communicatively coupled to the exhaust aftertreatment system, where the controller is configured to control operations of the exhaust aftertreatment system and to receive signals representative of the measured concentrations of nitrogen oxides ($NO_x$) in the fluid upstream or downstream of the SCR catalyst, to receive signals representative of the measured concentrations of $NH_3$ in the fluid upstream or downstream of the SCR catalyst, or any combination thereof. The controller is also configured to receive a signal representative of the $NH_3$ storage measurement from the at least one RF probe. An $NH_3$ storage estimate model is configured to determine an $NH_3$ storage estimate based on at least the signals representative of the measured concentrations of $NO_x$ in the fluid upstream or downstream of the SCR catalyst, the signals representative of the measured concentrations of $NH_3$ in the fluid upstream or downstream of the SCR catalyst, or any combination thereof. The controller utilizes at least both the estimated $NH_3$ storage estimate and the $NH_3$ storage measurement to output a control action for the injection system.

In accordance with a second embodiment, a controller of an exhaust aftertreatment system is configured to treat emissions from a combustion engine and to receive signals representative of measured concentrations of ammonia ($NH_3$) or nitrogen oxides ($NO_x$) within a fluid upstream of a selective catalytic reduction (SCR) catalyst assembly. The controller may receive signals representative of the measured concentrations of $NH_3$ or $NO_x$ in the fluid downstream of the SCR catalyst. The controller utilizes an $NH_3$ storage estimate model to determine an $NH_3$ storage estimate of the SCR catalyst based on the measured concentrations of $NO_x$ in the fluid upstream or downstream of the SCR catalyst and/or the measured concentrations of $NH_3$ in the fluid upstream or downstream of the SCR catalyst. The controller receives a signal representative of an $NH_3$ storage measurement of the SCR catalyst from at least one RF probe disposed within the SCR catalyst. The controller also controls an amount of urea or ammonia injected by an injection system into the fluid upstream of an inlet of the SCR catalyst assembly based at least on both the $NH_3$ storage measurement and the $NH_3$ storage estimate.

In accordance with a third embodiment, a method for controlling urea or ammonia ($NH_3$) injection into a fluid upstream of an inlet of a selective catalytic reduction (SCR) catalyst assembly includes utilizing a controller to receive signals representative of measured concentrations of nitrogen oxides ($NO_x$) and/or $NH_3$ upstream and/or downstream of the SCR catalyst assembly, and receive signals representative of an $NH_3$ storage measurement of the SCR catalyst assembly from at least one radio frequency (RF) probe disposed within the SCR catalyst. The method also includes utilizing an $NH_3$ storage estimate model to determine an $NH_3$ storage estimate based on at least the signals representative of the measured concentrations of $NO_x$ in the fluid upstream and/or downstream of the SCR catalyst and/or the signals representative of the measured concentrations of $NH_3$ in the fluid upstream and/or downstream of the SCR catalyst to determine the $NH_3$ storage estimate. The method further includes outputting a control action for an injection system based at least in part on the NH3 storage estimate and the NH3 storage measurement, where the injection system injects an amount of $NH_3$ or urea into the fluid upstream of the inlet of the SCR catalyst assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
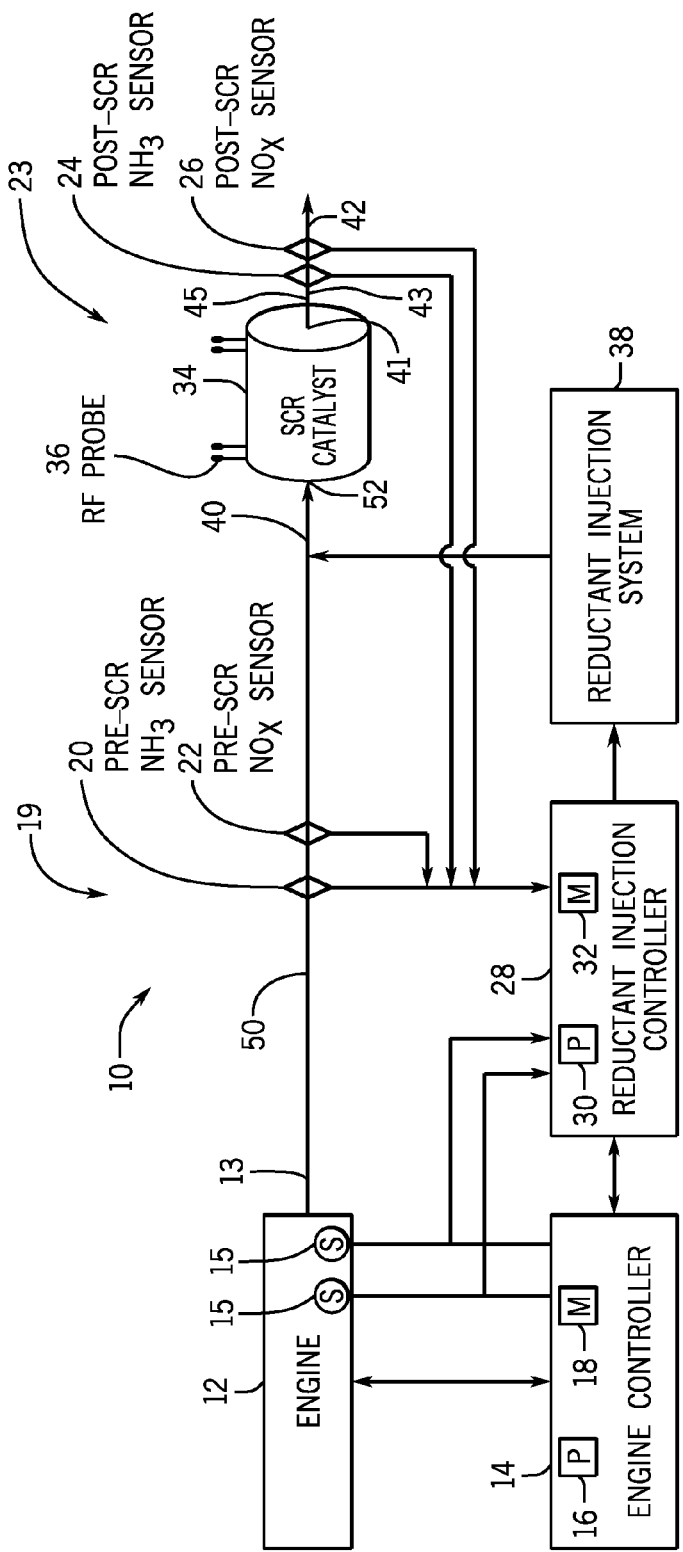
FIG. 1 is a schematic diagram of an embodiment of an exhaust treatment (e.g., aftertreatment) system coupled to an engine.

One or more specific embodiments of the present invention will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods that utilize aftertreatment systems for reduction of emissions from an engine exhaust. In particular, embodiments of the present disclosure utilize a catalyst assembly (e.g., selective catalyst reduction (SCR)) configured to actively control the reduction of emissions from an engine exhaust by a reductant injection system. The reductant injection system may be utilized to control the amount of reductant (e.g., urea) injected in a fluid upstream of the SCR catalyst assembly. The SCR catalyst assembly includes one or more radio frequency (RF) sensors disposed within the SCR catalyst assembly such that an ammonia ($NH_3$) storage measurement is output to a controller. The controller also utilizes an $NH_3$ storage estimate model. The controller receives, as input for the $NH_3$ storage estimate model, information pertaining to the engine inputs (e.g., exhaust temperature, exhaust flow rate) via sensors disposed on the engine or within the exhaust. The controller also receives, as input for $NH_3$ storage estimate model, information including but not limited to the concentrations of emissions (e.g., $NO_x$, $NH_3$, etc.) upstream and/or downstream of the SCR catalyst assembly via sensors (e.g., $NO_x$ sensors, $NH_3$ sensors, etc.) disposed upstream and/or downstream of the SCR catalyst assembly. Based on the received information, the $NH_3$ storage model estimates an $NH_3$ storage estimate for the SCR catalyst. The controller utilizes the $NH_3$ storage estimate and the $NH_3$ storage measurement to calculate an error value or theta control signal. The theta control signal may be utilized by the controller (e.g., in a urea/$NH_3$ injection control algorithm) along with measurements of $NO_x$ and/or $NH_3$ to generate a urea/$NH_3$ injection command to adjust or maintain an amount of urea/$NH_3$ injected upstream of the SCR catalyst assembly. The disclosed system and methods enable more precise monitoring and/or control of $NO_x$ and $NH_3$ emissions, especially under lean burn engine operating conditions.

Turning now to the drawings and referring to FIG. 1, a schematic diagram of an exhaust treatment (e.g., aftertreatment) system 10 coupled to an engine 12 is illustrated. As described in detail below, the disclosed exhaust treatment system 10 monitors and controls treatment of emissions. During operation, the engine 12 generates combustion gases used to apply a driving force to a component of the engine 12 (e.g., one or more pistons or turbines). The combustion gases subsequently exit the engine 12 as the exhaust 13, which includes a variety of emissions (e.g., $NO_x$, hydrocarbons, CO, etc.). The exhaust treatment system 10 treats these emissions to generate milder emissions (nitrogen ($N_2$), carbon dioxide ($CO_2$), water, etc). As depicted, the exhaust treatment system 10 includes catalytic converters or catalysts assemblies, such as the SCR catalyst assembly 34. In embodiments that include the SCR catalyst assembly 34, the engine 12 may be operated as a lean-burn engine, generating NOx emissions requiring reduction or other treatment via the SCR catalyst assembly 34. The SCR catalyst assembly 34, via its catalytic activity, reduces NO via multiple reactions. For example, $NO_x$ may be reduced via a gaseous reductant (e.g., urea) to generate $N_2$, $CO_2$, and $H_2O$, and $NO_x$ may be reduced via anhydrous or aqueous ammonia to generate $N_2$ and $H_2O$. Several secondary reactions may occur with anhydrous or aqueous ammonia resulting in ammonia sulfate and ammonia hydrogen sulfate. The SCR catalyst assembly 34 includes an inlet 52 to receive exhaust 13 from the engine 12 and an outlet 41 to discharge an aftertreatment fluid 43 via an SCR catalyst exit 42. A fluid conduit 50 is disposed between the engine 12 and the SCR catalyst assembly 34. Other equipment (e.g., a particulate filter, scrubber, or other operating equipment) may be present between the engine 12 and the SCR catalyst assembly 34 to prepare the SCR catalyst assembly 34 for receiving the exhaust 13. Specifically, the fluid conduit 50 is coupled to the engine 12 to direct the exhaust 13 to the SCR catalyst inlet 52 of the SCR catalyst assembly 34, thus, enabling fluid communication between them.

The reductant injection system 38 may be utilized to control the amount of reductant (e.g., urea) injected in the fluid upstream 40 of the SCR catalyst assembly 34. If the engine 12 is operating under a richer fuel condition, the amount of reductant (e.g., urea) injected may be greater than when the engine 12 operates leaner. Controlling the amount of urea injected allows for greater efficiency of $NO_x$ reduction in the SCR catalyst exit 42. As such, when the engine 12 operates under richer conditions, the reductant injection system 38 may inject greater amounts of urea as needed to achieve the desired $NO_x$ reduction efficiency. Similarly, when the engine 12 produces fewer $NO_x$ emissions, a smaller amount of urea is injected via the reductant injection system 38.

The engine 12 may include an internal combustion engine such as a reciprocating engine (e.g., multi-stroke engine such as two-stroke engine, four-stroke engine, six-stroke engine, etc.) or a gas turbine engine. The engine 12 may operate on a variety fuels (e.g., natural gas, diesel, syngas, gasoline, etc.). The engine 12 may operate as a lean-burn engine or a rich-burn engine. The engine 12 is coupled to an engine control unit (e.g., controller) 14 that controls and monitors the operations of the engine 12. The engine controller 14 includes processing circuitry (e.g., processor 16) and memory circuitry (e.g., memory 18). The processor 16 may execute instructions to carry out the operation of the engine 12. An exhaust 13 at the engine output includes various emissions (e.g., $NO_x$, hydrocarbons, $NH_3$) which are output at various temperatures and flow rates. Sensors 15 are coupled to or downstream of the engine 12 and are configured to measure the temperature and flow rates of the various exhaust 13 parameters. Various sensors 19 may be disposed downstream of the engine 12 and upstream of an SCR catalyst assembly 34. The sensors 19 may include one or more pre-SCR ammonia ($NH_3$) sensors 20 and/or one or more pre-SCR nitrogen oxides ($NO_x$) sensors 22 configured to measure the concentrations of the $NH_3$ and $NO_x$, respectively, in the fluid stream 13. A reductant (e.g., $NH_3$/urea) injection controller 28 may receive the measured concentrations from the pre-SCR $NH_3$ sensors 24 and/or the pre-SCR $NO_x$ sensors 22. The reductant injection controller 28 may receive measured concentrations of $NH_3$ and/or $NO_x$ downstream of an SCR catalyst assembly 34 from sensors 23. The sensors 23 may include post-SCR ammonia ($NH_3$) sensors 24 and/or post-SCR nitrogen oxides ($NO_x$) sensors 26 configured to measure the concentrations of the $NH_3$ and $NO_x$, respectively, in the fluid exiting an SCR catalyst outlet 42. The reductant injection controller 28 includes processing circuitry (e.g., processor 30) and memory circuitry (e.g., memory 32). The processor 30 may execute instructions to carry out the operation of the engine 12. The reductant injection controller 28 is configured to carry out a control action 54 for the injection system 38. For example, the reductant injection controller 28 may cause that the injection system 38 to maintain or alter an amount of reductant (e.g., $NH_3$ or urea) injected into the fluid upstream 40 of the inlet 52 of the SCR catalyst assembly 34.

Figure 2:
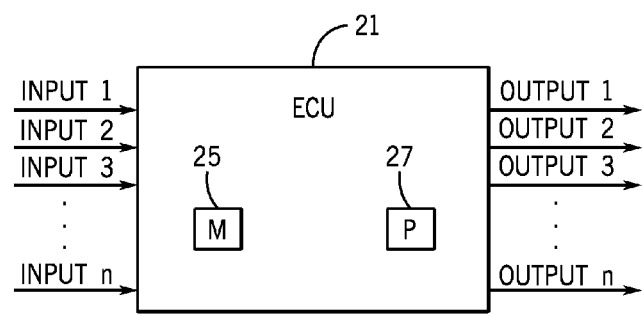
FIG. 2 is a block diagram of an embodiment of a controller (e.g., an electronic control unit (ECU))

FIG. 2 is a block diagram of an embodiment of a controller 21. As mentioned above, a controller 14 generally controls the operation of the internal combustion system 12, and a controller 28 controls the reductant injection system 38. In some embodiments, a single controller 21 may control both the operation of the internal combustion system 12 and the reductant injection system 38. The controller 21 includes non-transitory code or instructions stored in a machine-readable medium (e.g., memory 25) and used by a processor (e.g., processor 27) to implement the techniques disclosed herein. The memory 25 may store various tables and/or models (e.g., software models representing and/or simulating various aspects of the combustion system 12, the injection system 38, and each component of the systems 12 and 38). In certain embodiments, the memory 25 may be wholly or partially removable from the controller 21. The controller 21 receives one or more input signals from sensors ($input_1 \ldots input_n$) including engine inputs 62, and other components (e.g., user interface) of the system 10 and outputs one or more output signals ($output_1 \ldots output_n$). The various input signals may include engine outputs (e.g., temperature, flow rate), emissions concentrations (e.g., $NH_3$ concentration), or other operating conditions of the aftertreatment system 10. The output signals may include an adjustment to an injection command (e.g., control action 54) or another adjustment to the system. The controller 21 may utilize one or more types of models (e.g., software-based models executable by a processor). For example, the models may include statistical models, such as regression analysis models. Regression analysis may be used to find functions capable of modeling future trends within a certain error range. Association techniques may be used to find relationship between variables. Also, the data utilized with the models may include historical data, empirical data, knowledge-based data, and so forth.

The controller 21 may include a control action determiner to set an acceptable amount of reductant to be injected. In certain embodiments, the controller 21 may include a proportional-integral-derivative (PID) controller. The control action determiner may be software-based, hardware-based, or a combination of both. The control action determiner may determine an initial, desired $NO_x$ emissions level exiting the SCR catalyst assembly 34 based on one operating parameters received from the sensors 19, 23 disposed throughout the aftertreatment system 10 and/or other input, such as an $NH_3$ storage measurement 70 determined via one or more RF probes 36 disposed within the SCR catalyst assembly 34. In certain embodiments, an $NH_3$ storage estimate model 56 (e.g., a software-based model executable by a processor), which may be stored in memory 25 of the controller 21, may be utilized by an $NH_3$ storage estimator 57 to determine an $NH_3$ storage estimate 68. The operating parameters relied upon by the $NH_3$ storage estimate model 56 may include measured concentrations of $NH_3$ and/or nitrogen oxides upstream 40 and/or downstream 45 of the SCR catalyst assembly 34, engine inputs 62, and the $NH_3$ storage measurement 70 measured by the RF probes 36. The controller 21 may then output a control action 54 for the reductant injection system 38, based at least in part on the $NH_3$ storage estimate 68, engine inputs 62, and $NH_3$ storage measurement 70. In certain embodiments, the controller 21 may determine an $NH_3$ storage error value 72 between the $NH_3$ storage estimate 68 and the $NH_3$ storage measurement 70 and output the control action 54 based at least in part on the $NH_3$ storage error value 72.

Figure 3:
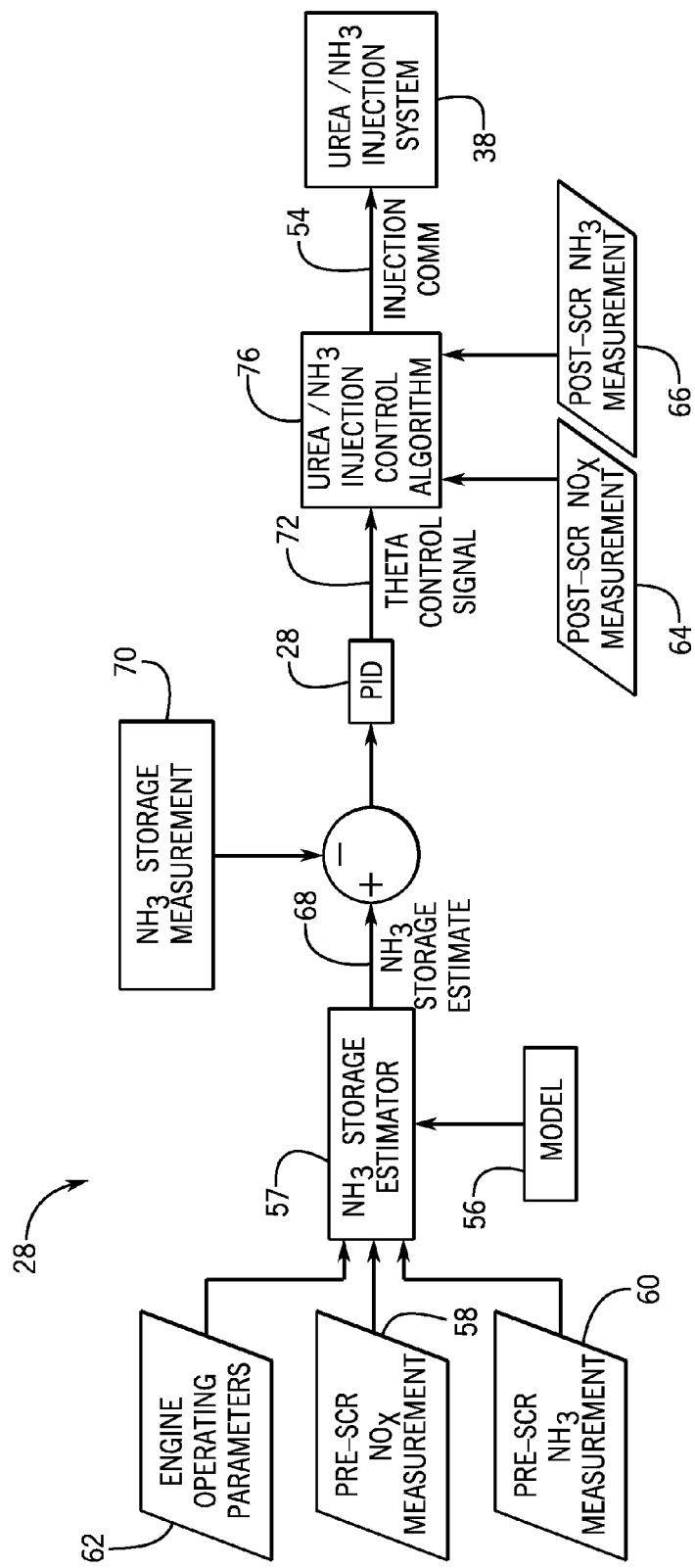
FIG. 3 is a schematic diagram of the functional operation of the controller to control and/or monitor the exhaust treatment system of FIG. 1.

FIG. 3 is a schematic diagram of the functional operation of the controller to control and/or monitor the exhaust treatment system 10 of FIG. 1. An $NH_3$ storage measurement 70 measured via RF probes 36 is utilized in a reductant injection controller 28 in selective catalytic reduction (SCR) catalyst assemblies 34. As depicted, a reductant injection system 38 is configured to inject an amount of reductant (e.g., urea or ammonia) in a fluid upstream 40 of the SCR catalyst assembly 34. The amount of reductant is controlled via a reductant injection system 38, which utilizes a reductant injection controller 28 to output a control action 54. For example, the control action 54 output by the reductant injection controller 28 may require a greater flow rate of reductant (e.g., urea or ammonia) be injected to the fluid upstream 40 of the SCR catalyst assembly 34 such that a greater reduction efficiency occurs. The reductant injection controller 28 utilizes several variables in an ammonia ($NH_3$) storage estimate model 56. A $NH_3$ storage estimator 57 utilizes the $NH_3$ storage estimate model 56 to determine an $NH_3$ storage estimate 68. The variables utilized in the $NH_3$ storage estimate model 56 may include a pre-SCR $NO_x$ concentration 58 received from the pre-SCR $NO_x$ sensors 22, a pre-SCR $NH_3$ concentration 60 received from the pre-SCR $NH_3$ sensors 24, and/or engine inputs 62 (e.g., exhaust flow rates and exhaust temperature exiting the engine), or any combination thereof. In some embodiments, the $NH_3$ storage estimate model 56 may be used to estimate individual $NO$, $NO_2$, and/or $NH_3$ concentrations upstream and/or downstream of the SCR catalyst assembly 34. The $NH_3$ storage estimate model 56 utilizes at least these variables, in addition to engine operating inputs 62. The engine inputs 62 are representative of various engine parameters. The engine 12 includes a plurality of sensors 15 disposed throughout the system 12 to measure engine parameters (e.g., emissions concentrations in exhaust gases generated by the engine 12, emissions flow rates, emissions temperatures, etc.) and to provide feedback (e.g., via signals representative of the engine parameters) to the reductant injection controller 28. For example, one or more sensors 15 may be disposed within or adjacent or proximal to (e.g., downstream) the engine 12 and upstream of the SCR catalyst assembly 34. The one or more sensors 15 may measure a concentration of $NH_3$, $NO_x$, or other emissions or species in the exhaust 13 generated by the engine 12 prior to treatment (e.g., via the SCR assembly 34). Based at least in part on feedback from the one or more sensors 15, the reductant injection controller 28 may determine if the engine 12 whether the engine 12 is operating under a richer fuel condition. When the engine 12 operates under a richer fuel condition, the resulting emissions are generally higher and require reduction of the emission to form milder emissions. The $NH_3$ storage estimate model 56 utilizes at least these variables to generate an $NH_3$ storage estimate 68.

The $NH_3$ storage estimate 68 is utilized by the reductant injection controller 28 to generate the control action 54. The reductant injection controller 28 utilizes an $NH_3$ storage measurement 70 to generate the control action 54. The $NH_3$ storage measurement 70 is received via the RF probes 36 disposed within the SCR catalyst assembly 34. The RF probes 36 output a voltage measurement to determine the amount of $NH_3$ stored within the SCR catalyst assembly 34. In some embodiments, the reductant injection controller 28 may be a proportional-integral-derivative controller. The reductant injection controller 28 utilizes the $NH_3$ storage estimate 68 and the $NH_3$ storage measurement 70 to calculate an error value 72 (e.g., theta control signal) as the difference between the $NH_3$ storage estimate 68 and the $NH_3$ storage measurement 70. In some embodiments, the storage error value 72 may utilize NO, $NO_2$, and/or $NH_3$ concentrations estimated by the $NH_3$ storage estimate model 56 to output the control action 54. The reductant injection control algorithm 76 attempts to minimize the error by adjusting the process to output the control action 54 based on the $NH_3$ storage error value 72, the post-SCR $NO_x$ concentration 64, and the post-SCR $NH_3$ concentration 66. The control action 54 may include an injection command increasing or reducing the amount of the reductant, increasing or reducing the temperature of the reductant, and so forth. The reductant injection controller 28 may provide a user-perceptible signal indicating the need for the corrective action. For example, a textual or visual indicator may be provided to a display of the reductant injection controller 28 or a display on remote device. Also, a visual (e.g., via a light emitting device such as an LED) or audible signal (e.g., via a speaker) may be provided on the reductant injection controller 28 or a remote device. The reductant injection controller 28 includes processing circuitry (e.g., processor 30) and memory circuitry (e.g., memory 32). The processor 30 may execute instructions to monitor system parameters (fuel operating condition (e.g., rich fuel condition), emissions levels (e.g., $NO_x$), etc.), regulate (e.g., maintain) the flow rate or temperature of the fluid 40 entering the inlet 52 of the SCR assembly 34. These instructions may be encoded in programs or code stored in a tangible non-transitory computer-readable medium (e.g., an optical disc, solid state device, chip, firmware) such as the memory 32. The processor 30 may also access tables or values stored in the memory 32. In certain embodiments, the reductant injection system 38 may be actively driven via a pump or injector. In other embodiments, the reductant injection system 38 may occur via passive entrainment.

Figure 4:
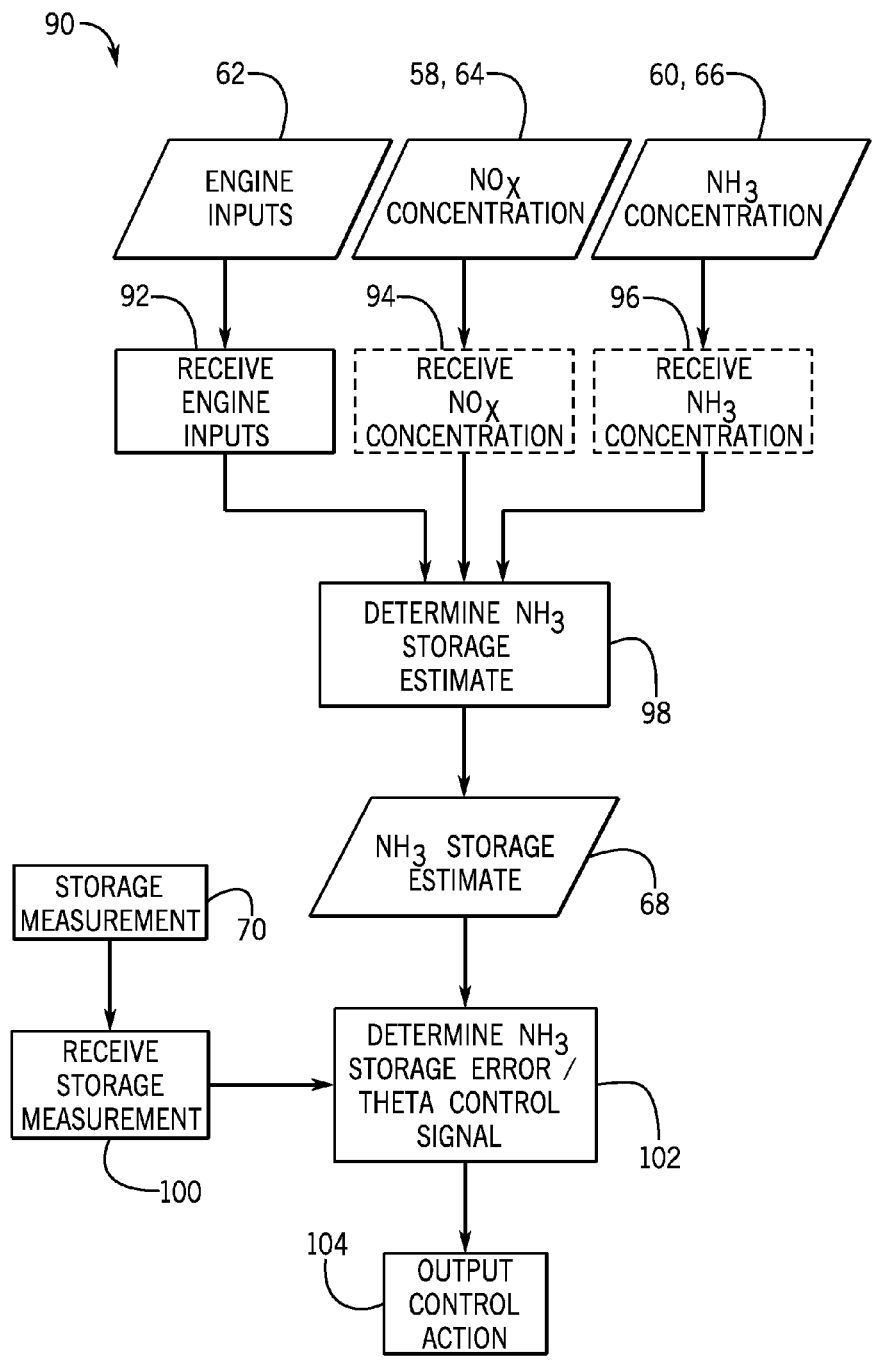
FIG. 4 is a flow chart of an embodiment of a computer-implemented method for controlling an amount of $NH_3$ or urea injected upstream of a SCR assembly.

FIG. 4 is a flow chart of an embodiment of a computer-implemented method 90 for controlling an amount of $NH_3$ or urea injected upstream 40 of a SCR assembly 34. All or some of the steps of the method 90 may be executed by the reductant injection controller 28 (e.g., utilizing the processor 30 to execute programs and access data stored on the memory 32). The method 90 further includes receiving actual operating parameters from the engine (block 92). The method 90 may include receiving concentrations of $NO_x$ within a fluid upstream and/or downstream of the SCR assembly (block 94) and/or receiving concentrations of $NH_3$ within a fluid upstream and/or downstream of the SCR catalyst assembly (block 96). The method 90 further includes utilizing an $NH_3$ storage estimate model to determine an $NH_3$ storage estimate (block 98). The method may further include receiving an $NH_3$ storage estimate via RF probes (block 100). The method 90 may further include determining and correcting the error value between the $NH_3$ storage estimate and the $NH_3$ storage measurement and to output the control action based on the $NH_3$ storage error value, and determining a $NO_x$ error value between the pre-SCR $NO_x$ concentration and the post-SCR $NO_x$ concentration (block 102) to output the control action based on the $NO_x$ error value (block 104). The output action may include increasing or decreasing the flow rate of the reductant, increasing or reducing the temperature of the reductant, and so forth. If the desired $NO_x$ reduction is achieved, the reductant injection controller maintains the current reductant injection command to continue current reduction efficiency.

Technical effects of the disclosed embodiments include systems and methods that utilize aftertreatment systems for reduction of emissions from an engine exhaust. Embodiments of the present disclosure utilize a catalyst assembly (e.g., selective catalyst reduction (SCR)) configured to actively control the reduction of emissions from exhaust by a reductant injection system. The reductant injection system may be utilized to control the amount of reductant (e.g., urea or $NH_3$) injected in a fluid upstream of the SCR catalyst assembly. The SCR catalyst assembly includes radio frequency (RF) sensors disposed within the SCR catalyst assembly such that an ammonia ($NH_3$) storage measurement is output to a controller. The controller also utilizes an $NH_3$ storage estimate model. The $NH_3$ storage estimate model receives information pertaining to the engine inputs (e.g., exhaust temperature, exhaust flow rate) via sensors disposed on the engine or within the exhaust. The $NH_3$ storage estimate model also receives information including, but not limited to, the concentrations of emissions (e.g., $NO_x$, $NH_3$, etc.) upstream and/or downstream of the SCR catalyst assembly via sensors (e.g., $NO_x$ sensors, $NH_3$ sensors, etc.) disposed upstream and/or downstream of the SCR catalyst assembly. Based on the received information, the $NH_3$ storage model estimates an $NH_3$ storage estimate for the SCR catalyst. The controller utilizes the $NH_3$ storage estimate and the $NH_3$ storage measurement to calculate an error value or theta control signal which the controller utilizes to generate a theta control signal. The theta control signal may be utilized by the controller (e.g., in a urea/$NH_3$ injection control algorithm) along with measurements of $NO_x$ and/or $NH_3$ to generate a urea/$NH_3$ injection command (e.g., adjust, maintain) to control an amount of urea/$NH_3$ injected upstream of the SCR catalyst assembly. The disclosed system and methods enable more precise monitoring and/or control of $NO_x$ and $NH_3$ emissions, especially under lean burn engine operating conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
   an exhaust aftertreatment system configured to treat emissions from a combustion engine, wherein the exhaust aftertreatment system comprises:
      a selective catalytic reduction (SCR) catalyst assembly configured to receive a fluid from the combustion engine, wherein the SCR catalyst assembly has an inlet and an outlet;
      at least one radio frequency (RF) probe disposed within the SCR catalyst and configured to measure ammonia ($NH_3$) storage of the SCR catalyst;

an injection system configured to inject NH$_3$ or urea into the fluid upstream of the inlet of the SCR catalyst;

a controller communicatively coupled to the exhaust aftertreatment system, wherein the controller is configured to control operations of the exhaust aftertreatment system and to receive signals representative of the measured concentrations of nitrogen oxides (NO$_x$) or NH$_3$ in the fluid upstream of the SCR catalyst, to receive signals representative of the measured concentrations of NO$_x$ or NH$_3$ in the fluid downstream of the SCR catalyst, or any combination thereof; and a signal representative of the NH$_3$ storage measurement from the at least one RF probe; and an NH$_3$ storage estimate model configured to determine an NH$_3$ storage estimate based on at least the signals representative of the measured concentrations of NO$_x$ or NH$_3$ in the fluid upstream of the SCR catalyst or the signals representative of the measured concentrations of NO$_x$ or NH$_3$ in the fluid downstream of the SCR catalyst, or any combination thereof;

wherein the controller is configured to utilize at least both the estimated NH$_3$ storage estimate and the NH$_3$ storage measurement to output a control action for the injection system.

2. The system of claim 1, comprising a first NO$_x$ sensor disposed upstream of the inlet of the SCR catalyst and configured to measure the concentration of NO$_x$ in the fluid upstream of the inlet, or disposed downstream of the outlet of the SCR catalyst and configured to measure the concentration of NO$_x$ in the fluid downstream of the outlet.

3. The system of claim 1, comprising a first NH$_3$ sensor disposed upstream of the inlet of the SCR catalyst and configured to measure the concentration of NH$_3$ in the fluid upstream of the inlet, or disposed downstream of the outlet of the SCR catalyst and configured to measure the concentration of NH$_3$ in the fluid downstream of the outlet.

4. The system of claim 1, comprising one or more sensors configured to measure the operating parameters of the combustion engine.

5. The system of claim 4, wherein the controller receives the operating parameters of the combustion engine and utilizes the NH$_3$ storage estimate model to determine the NH$_3$ storage estimate based at least in part on the operating parameters.

6. The system of claim 1, wherein the control action comprises adjusting an amount of NH$_3$ or urea injected into the fluid upstream of the inlet of the SCR catalyst.

7. The system in claim 1, wherein the controller is configured to receive signals representative of the measured concentrations of (NO$_x$) and NH$_3$ in the fluid upstream of the SCR catalyst.

8. The system of claim 1, comprising the combustion engine coupled to the exhaust aftertreatment system.

9. The system of claim 1, wherein the controller is configured to determine an NH$_3$ storage error value between the NH$_3$ storage estimate and the NH$_3$ storage measurement and to output the control action based on the NH$_3$ storage error value.

10. A system, comprising:
a controller of an exhaust aftertreatment system configured to treat emissions from a combustion engine, wherein the controller is configured to receive signals representative of measured concentrations of ammonia (NH$_3$) or nitrogen oxides (NO$_x$) within a fluid upstream of a selective catalytic reduction (SCR) catalyst assembly or to receive signals representative of the measured concentrations of NH$_3$ or (NO$_x$) in the fluid downstream of the SCR catalyst, or any combination thereof, to utilize an NH$_3$ storage estimate model to determine an NH$_3$ storage estimate of the SCR catalyst based on the measured concentrations of NO$_x$ in the fluid upstream or downstream of the SCR catalyst and/or the measured concentrations of NH$_3$ in the fluid upstream or downstream of the SCR catalyst, to receive a signal representative of an NH$_3$ storage measurement of the SCR catalyst from at least one radio frequency (RF) probe disposed within the SCR catalyst, and to control an amount of urea or ammonia injected by an injection system into the fluid upstream of an inlet of the SCR catalyst assembly based at least on both the NH$_3$ storage measurement and the NH$_3$ storage estimate.

11. The system of claim 10, wherein the controller is configured to receive signals representative of the measured parameters of the combustion engine.

12. The system of claim 11, wherein the controller is configured to utilize the NH$_3$ storage estimate model to determine an NH$_3$ storage estimate based at least in part on the measured operating parameters.

13. The system of claim 10, wherein the controller is a proportional-integral-derivative controller.

14. The system of claim 10, wherein the controller is configured to determine an NH$_3$ storage error value between the NH$_3$ storage estimate and the NH$_3$ storage measurement and to output the control action based on the NH$_3$ storage error value.

15. A method for controlling urea or ammonia (NH$_3$) injection into a fluid upstream of an inlet of a selective catalytic reduction (SCR) catalyst assembly coupled to a combustion engine, comprising:
utilizing a controller to:
receive signals representative of measured concentrations of nitrogen oxides (NO$_x$) and/or NH$_3$ upstream and/or downstream of the SCR catalyst assembly; and receive signals representative of an NH$_3$ storage measurement of the SCR catalyst assembly from at least one radio frequency (RF) probe disposed within the SCR catalyst;

utilize an NH$_3$ storage estimate model to determine an NH$_3$ storage estimate based on at least the signals representative of the measured concentrations of NO$_x$ in the fluid upstream or downstream of the SCR catalyst and/or the signals representative of the measured concentrations of NH$_3$ in the fluid upstream or downstream of the SCR catalyst to determine the NH$_3$ storage estimate; and output a control action for an injection system, based at least in part on the NH$_3$ storage estimate and the NH$_3$ storage measurement, wherein the injection system injects an amount of NH$_3$ or urea into the fluid upstream of the inlet of the SCR catalyst assembly.

16. The method of claim 15, comprising utilizing the controller to:
determine a NH$_3$ storage error value between the NH$_3$ storage estimate and the NH$_3$ storage measurement; and output the control action based on the NH$_3$ error value.

17. The method of claim 15, wherein the control action comprises generating an NH$_3$ or urea injection command that adjusts an injection rate of NH$_3$ or urea to achieve a desired NO$_x$ emission level exiting the SCR assembly.

18. The method of claim 15, wherein the control action comprises receiving signals representative of measured operating parameters of the combustion engine.

19. The method of claim 18, wherein the control action comprises utilizing the $NH_3$ storage estimate model to determine the $NH_3$ storage estimate based at least in part of the operating parameters.

20. The method of claim 18, wherein the operating parameters comprise an exhaust flow rate and a temperature of an exhaust exiting the combustion engine.

* * * * *